A. & C. W. Palmer,
Harvester Rake.
No. 99,340. Patented Feb. 1, 1870.
4 Sheets, Sheet 4.
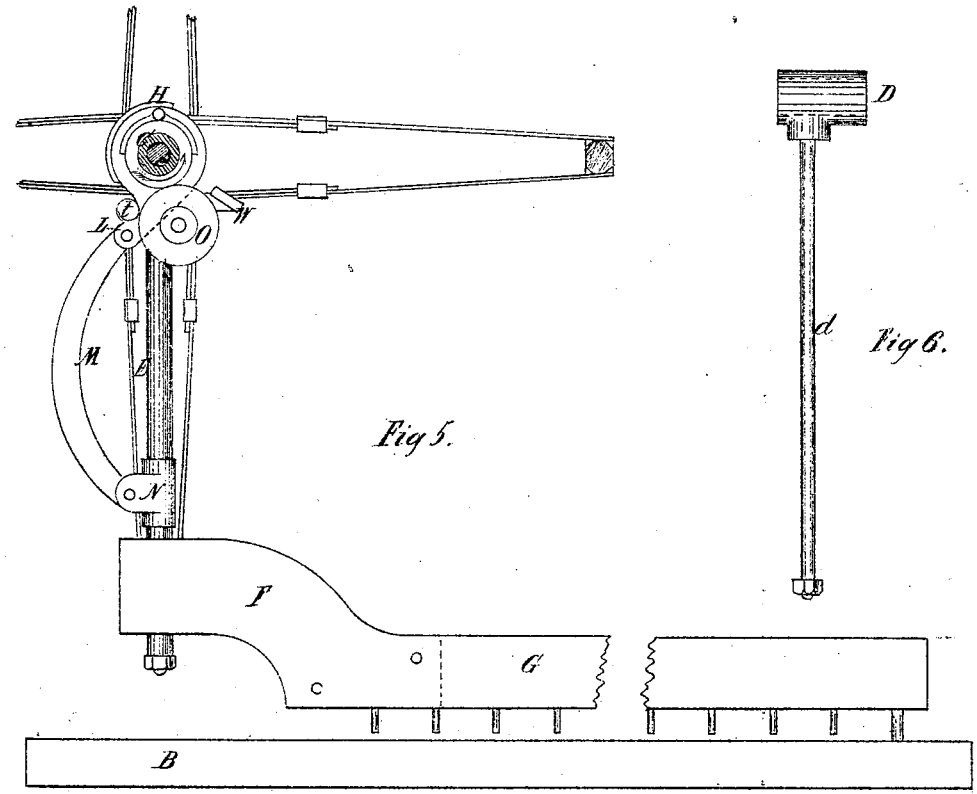
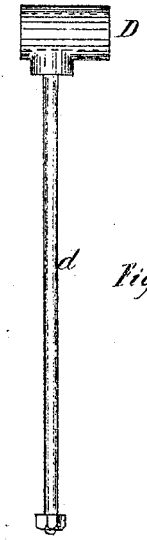
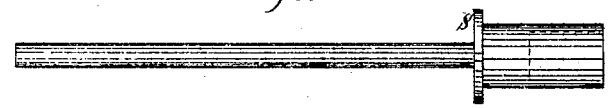

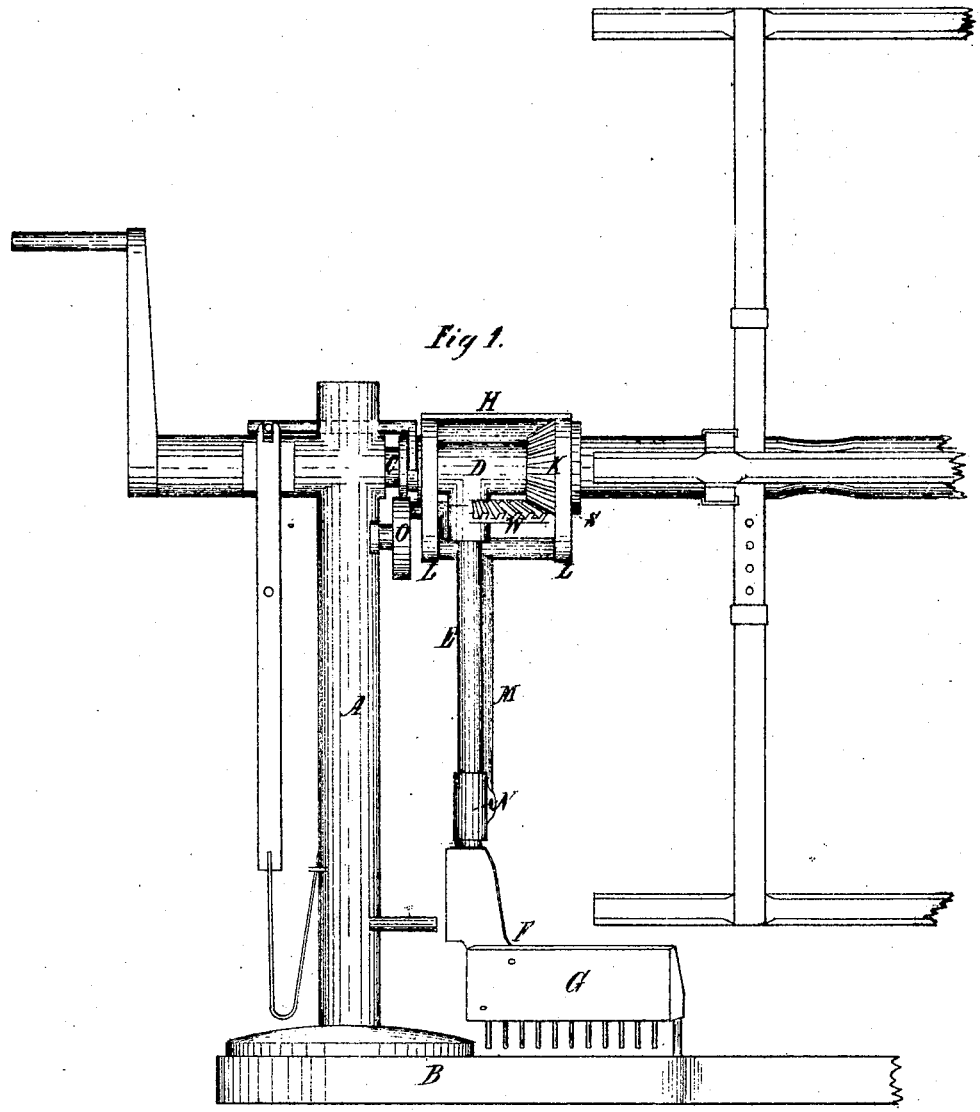

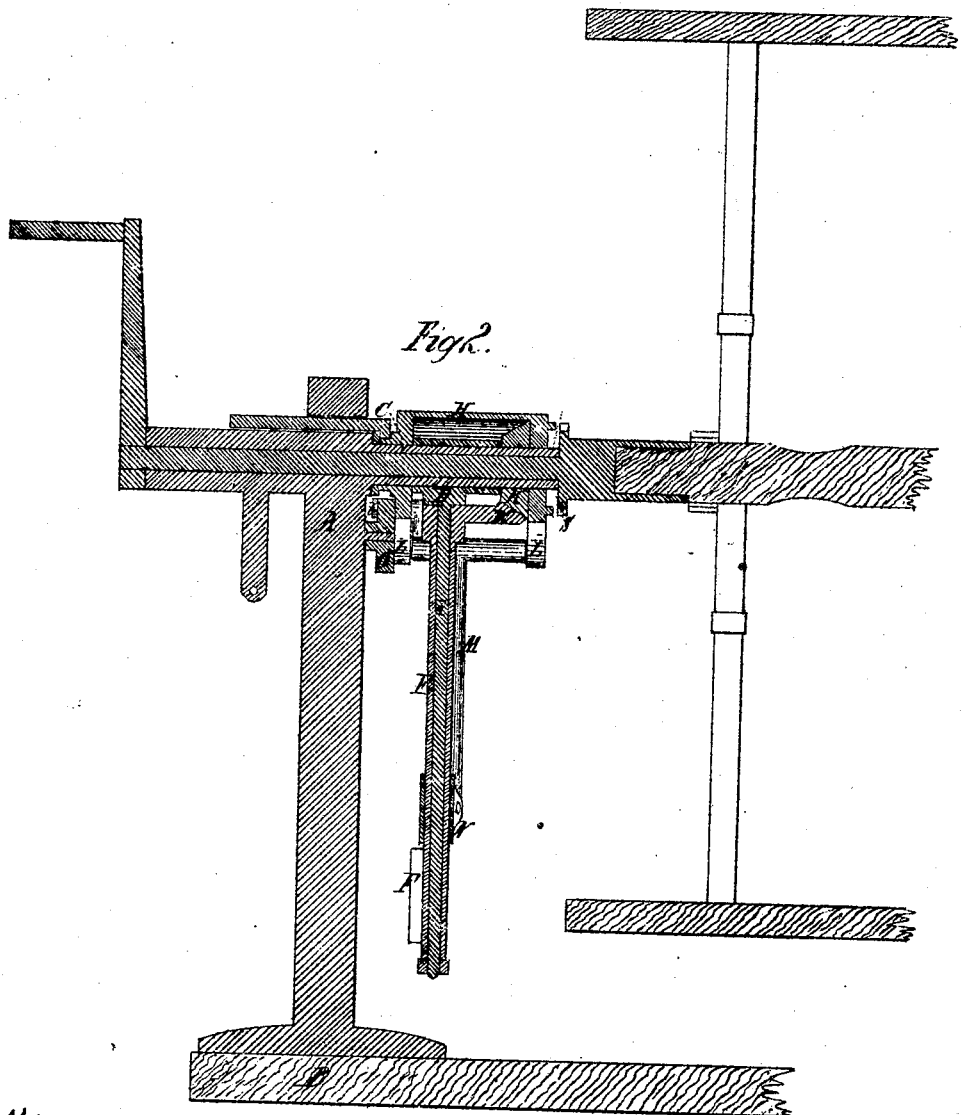

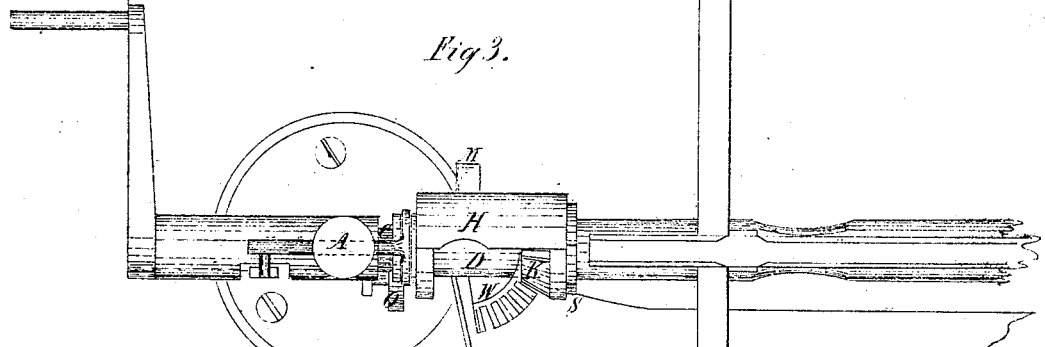
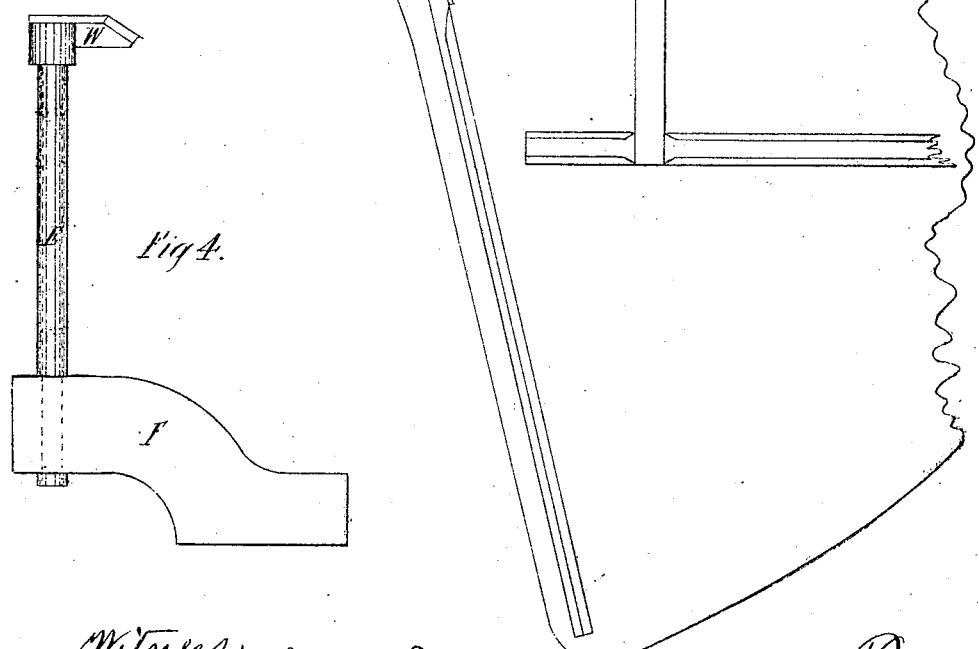

United States Patent Office.

AARON PALMER AND CHARLES W. PALMER, OF BROCKPORT, NEW YORK.

Letters Patent No. 99,340, dated February 1, 1870.

IMPROVEMENT IN HARVESTER-RAKE.

The Schedule referred to in these Letters Patent and making part of the same.

*To all whom it may concern:*

Be it known that we, AARON PALMER, and CHARLES W. PALMER, both of Brockport, in the county of Monroe, and State of New York, have invented certain new and useful Improvements in Harvester-Rakes, of which the following is a full, clear, and exact description.

Our invention relates to that class of harvesters having a reel, rotating on an axis horizontal, and a rake rotating around said reel, and also having a horizontal turning-movement imparted to it, to discharge the cut grain at one side of the machine, out of the path of the team in its succeeding tour around the field.

The object of our invention is so to combine the reel and rake that they may be operated simultaneously, or independently of each other, at the will of the driver.

In the accompanying drawings—

Figure 1 represents a view, in elevation, of so much of a harvester, embracing our improvements, as is necessary to illustrate the invention herein claimed, as seen from behind;

Figure 2, a vertical central longitudinal section through the rake and reel-shaft;

Figure 3, a plan or top view of the apparatus;

Figure 4, a view of the rake-arms detached;

Figure 5, a view, in elevation, of the apparatus, as seen from the gearing-side of the machine, with the supporting-standard removed;

Figure 6, a view of the sleeve and pivot which carries the rake-arm; and

Figure 7, a view of the reel-driving shaft.

In order to carry out the objects of our invention, we mount the raking and reeling-apparatus in a common support, standard, or post, A, attached, in any convenient manner, to the frame, finger-beam, or platform B of the machine.

The entire working-apparatus of the rake and reel is supported in a hollow bracket, C, cast with or otherwise secured upon the post A.

A sleeve, D, rotating and sliding freely endwise on the bracket C, carries an arm or pendent rod, $d$, fig. 6, upon which the rake-arm is mounted.

A sleeve, E, fig. 4, turning freely on the arm $d$, carries, at its lower end, an arm, F, to which the rake G is attached.

An open sleeve, H, overlaps the sleeve D, and fits closely, but turns freely, on the bracket C. The sleeve D works freely in this open sleeve H, but its vibration is limited by the opening in the sleeve H, as hereinafter explained.

A bevel-gear, K, on the sleeve H, gears into a corresponding segment-gear, W, on the sleeve E, and thus causes the rake to turn on its axis $d$, as hereinafter explained.

Lugs L L, on the sleeve H, are connected by a lifting-bar, M, pivoted to oscillate in its bearings. (See fig. 5.) This arm is T-shaped, its branches forming the pivot on which it rocks, and its lower end is curved and pivoted to a collar, N, sliding freely on the sleeve E.

A stud, $t$, projects from the pivot of the arm M, beyond the inner end of the sleeve H, and bears upon a friction-roller, O, on the post A. This stud $t$ serves as a fulcrum, by means of which, the sleeve H and arm M rotate the rake about its axis C, as hereinafter explained.

The reel is attached to, and rotates with a shaft, I, extending through the bracket C. A shoulder, S, on this shaft, retains the rotating parts of the rake on the bracket. C. The space between this shoulder and that of the bracket is made somewhat greater than the length of the sleeve H, in order that it may move endwise to stop or start the rake.

Pins $h$, on the sleeve, engage with corresponding notches in the shoulder $s$, to connect or disconnect the rake from the reel.

The sleeve H is moved endwise by means of a shipping-device, such as shown in the drawings, or one of some other well-known construction.

The following is the operation of our rake:

The reel is rotated continuously in the usual way. We will suppose the parts to be in the position shown in fig. 3, with the rake in gear. As the reel rotates, the rake is carried upward and forward around its axis, the arm E bearing against the lifting-arm M. As the rake passes in front of its axis, its weight causes it to descend within the circle described by the reel-beaters, and it enters the standing grain close behind one of the beaters. The rake strikes the platform, with its length parallel to the finger-beam, and then moves backward a short distance in the same relation thereto. The rake-arm F then strikes a stud, $f$, on the rake-post, which arrests the backward movement of that end, while the outer end describes a curve, of which the arm $d$ forms the centre, thus turning the gavel, and sweeping it off the platform. This movement is caused by the sleeve E being partially rotated by the action of the pinion K on the segment-gear W. The straining of the rake-arm is thus avoided.

When the rake assumes the position shown in fig. 3, it pauses for a moment, until the bar M strikes the sleeve E and lifts the rake. The sleeve N moves freely on the arm E, to accommodate these movements. As the rake rises, the stud $t$ bears on the friction-roller O, and thus converts the arm M into a lever to lift the rake.

Our rake, it will be observed, has a motion of rotation around the reel-axis, and a turning movement on its arm. The lifting-arm rotates around the reel-axis, and also oscillates on its pivots in the lugs L of the open sleeve, this latter movement being controlled by the stud $t$, acting on the guide O. The rake is lifted by the stud $t$, and turned by the gears K W.

We claim, as our invention—

1. The combination of the lifting-arm, sliding on the rake-arm, its stud $t$, and the guide O on the rake-post, all these parts being constructed to operate substantially as hereinbefore set forth.

2. The combination of the rake, the sleeve D, the pendent rod $d$, the sleeve E, and its segment-gear, with the pinion on the open sleeve, all these parts being constructed to operate substantially as hereinbefore set forth.

3. The combination of the bracket, the reel-shaft, the open sleeve H, and the sleeve D, all these parts being constructed to operate as hereinbefore set forth.

4. The combination of the bracket, reel-shaft, open sleeve, the sleeve carrying the rake-arm, and the lifting-arm, all these parts being constructed to operate substantially as hereinbefore set forth.

5. The combination of the rake, the arresting-stud on the rake-post, the segment-gear on the sleeve E, and the gear W on the open sleeve on the rake-shaft, all these parts being constructed to operate as hereinbefore set forth.

AARON PALMER.
CHAS. W. PALMER.

Witnesses:
JOHN W. RIPLEY,
THOS. J. BALDWIN.